UNITED STATES PATENT OFFICE.

ALLAN JAMES FIELD, OF NEW YORK, N. Y.

DYESTUFF AND PROCESS OF MAKING THE SAME.

1,383,710. Specification of Letters Patent. Patented July 5, 1921.

No Drawing. Application filed September 27, 1917. Serial No. 193,585.

*To all whom it may concern:*

Be it known that I, ALLAN JAMES FIELD, a subject of the King of Great Britain, residing in New York city, borough of Richmond, State of New York, have invented certain new and useful Improvements in Dyestuffs and Processes of Making the Same, of which the following is a full, clear, and exact specification.

This invention relates to dyestuffs, and processes of making the same, and aims to provide improvements therein.

The invention provides a new organic compound, which, mixed and dried with dextrin, constitutes a new blue dyestuff, which has a fastness to light and a richness of color equal to certain other blue dyestuffs of the benzidin class formed of more costly and more difficultly obtained intermediates than those used to produce the present dyestuff. In the form of the copper salt the fastness of the dyestuff is improved. The new compound or dyestuff is suitable for lake making.

The invention further provides an economical process for making the new compound or dyestuff.

The compound, especially in the form of its copper salt, provides a compound valuable in lake making, because of its rich color, fastness to light, and insolubility in water and oil. Other metals, such as barium, lead, aluminum calcium, or the like, may be substituted for the copper salt, though the copper salt is preferred.

The new dyestuff is derived from the combination, or combinations, of tetrazotized tolidin with 2-naphthol-6-sulfonic acid and 2-naphthol-8-sulfonic acid, which compound is believed to have the structural formula:

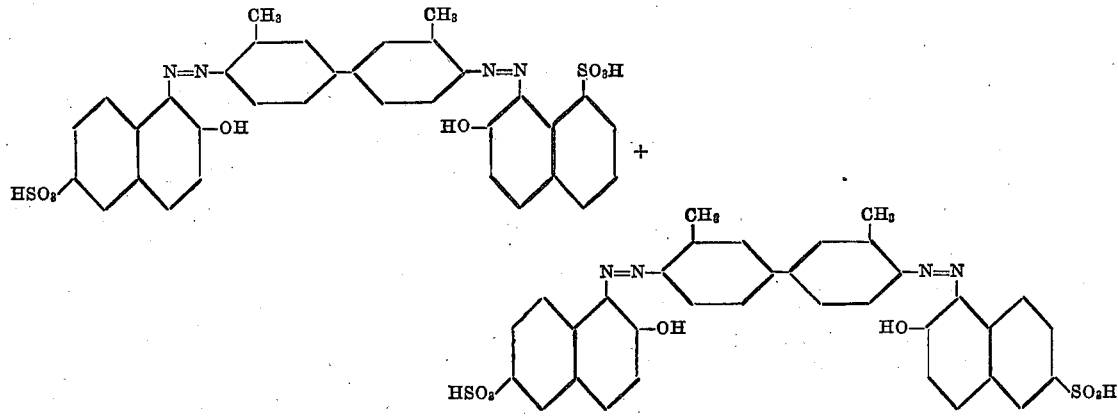

Or:

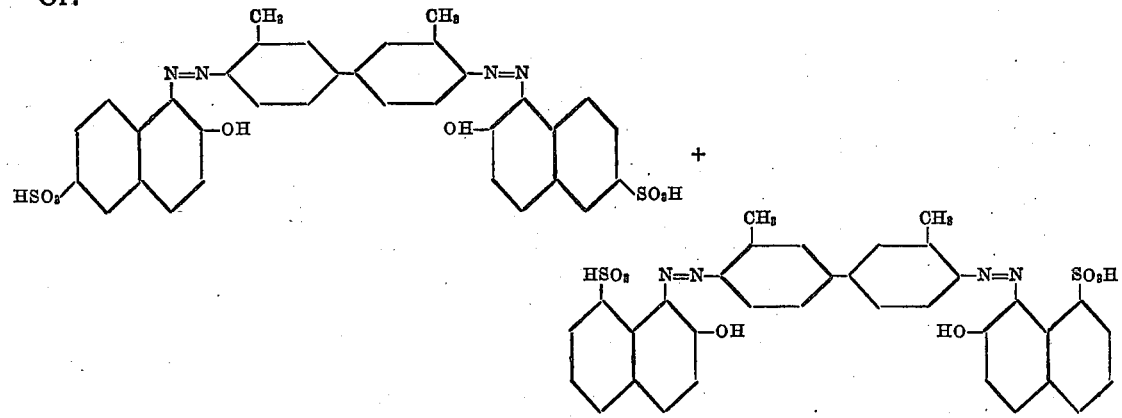

The method of producing the dyestuff is as follows:—

Example: Dissolve about 10 parts by weight of tolidin in a solution of 25 parts by weight of 31% hydrochloric acid and 150 parts by weight of hot water. Cool down to about 5° C. and slowly add an ice-cold solution of 6.8 parts by weight of sodium nitrite in 100 parts by weight of water. Stir for about 15 minutes, and then run this liquid into a mixture of 2-naphthol-6-sulfonic acid and 2-naphthol-8-sulfonic acid prepared as follows:

Mix 20 parts by weight of beta-naphthol with 14 parts by weight of 100% sulfuric acid, and heat for two or three hours at 100° C. Dissolve in 150 parts by weight of water, and neutralize with a solution of 10.4 parts by weight of sodium carbonate dissolved in 25 parts by weight of water. Add to this solution 10 parts by weight of sodium carbonate dissolved in 25 parts by weight of water and 10 parts by weight of ammonium hydrate of 28% strength. The entire solution is diluted to 1000 parts by weight with water, and cooled to 5° C. with ice. In this solution the amount of the 2-naphthol-6-sulfonic acid is greater than that of the 2-naphthol-8-sulfonic acid, and when produced by the foregoing method the two acids are in the right proportion to obtain the special shade of dyestuff desired by me.

The tetrazotized tolidin and the mixture of sulfonic acids, prepared as above, are then combined, and stirred for about 2 hours.

Then 30 parts by weight of copper sulfate dissolved in 200 parts by weight of water are added. After stirring well, the copper salt of the dyestuff which is now formed is washed and filtered. The copper salt of the dyestuff is insoluble in water. The pulp from the filter is then mixed with dextrin and dried. The mixture of the dyestuff, or its copper salt, with dextrin renders it water-soluble, and suitable for use in dyeing.

By increasing the proportion of 2-naphthol-8-sulfonic acid the dyestuff (and lake made therefrom) is given a reddish shade, and by increasing the proportion of 2-naphthol-6-sulfonic acid the dyestuff (and lake made therefrom) is given a greenish shade. By suitably increasing the proportion of one or the other of these sulfonic acids, the blue dyestuff (and lake made therefrom) may be given desired shades of red or green. The variation in the proportion of the two sulfonic acids may be brought about in the mixture by suitable conditions of working; for example, by heating at a lower temperature or for a shorter period, a greater proportion of 2-naphthol-8-sulfonic acid is produced.

What is claimed is:—

1. A compound constituting a pigment color and forming a dyestuff when mixed with dextrin, produced by combining tetrazotized tolidin with 2-naphthol-6-sulfonic acid and 2-naphthol-8-sulfonic acid, and having probably the formula:

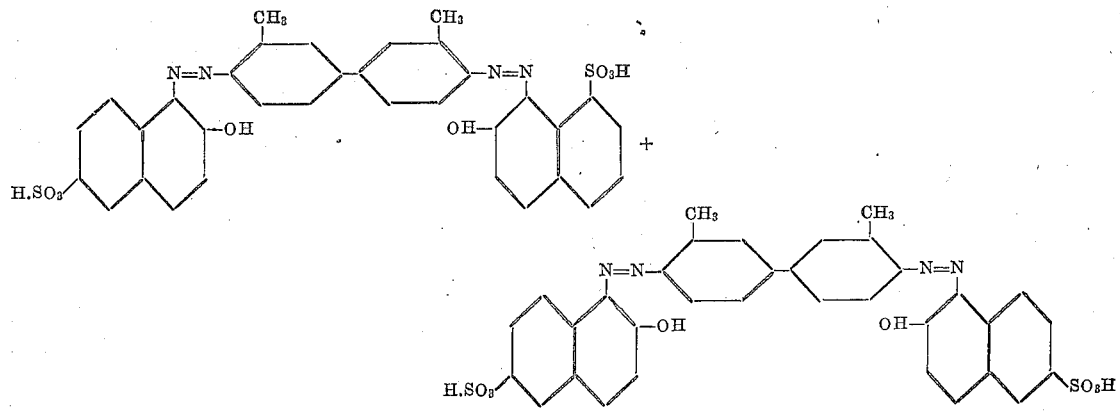

or,

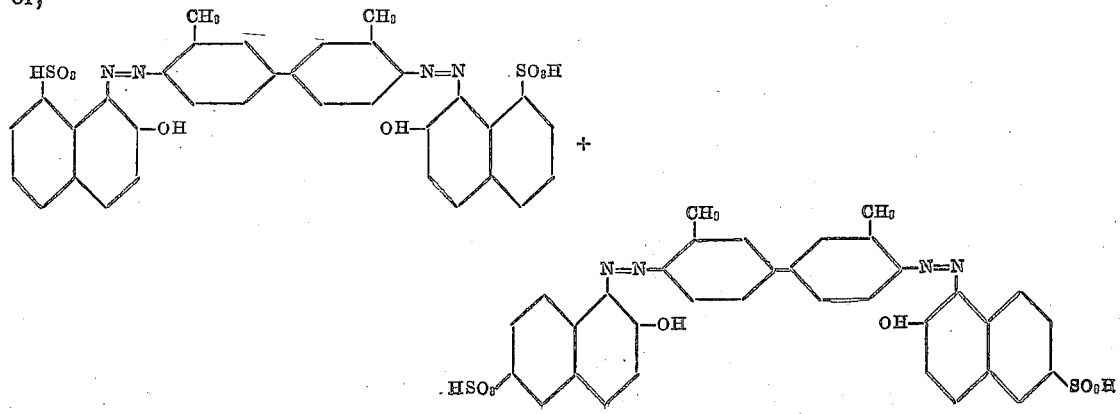

2. A compound constituting a pigment color and forming a dyestuff when mixed with dextrin, produced by combining tetrazotized tolidin with 2-naphthol-6-sulfonic acid and 2-naphthol-8-sulfonic acid and forming the copper salt, and having probably the formula:

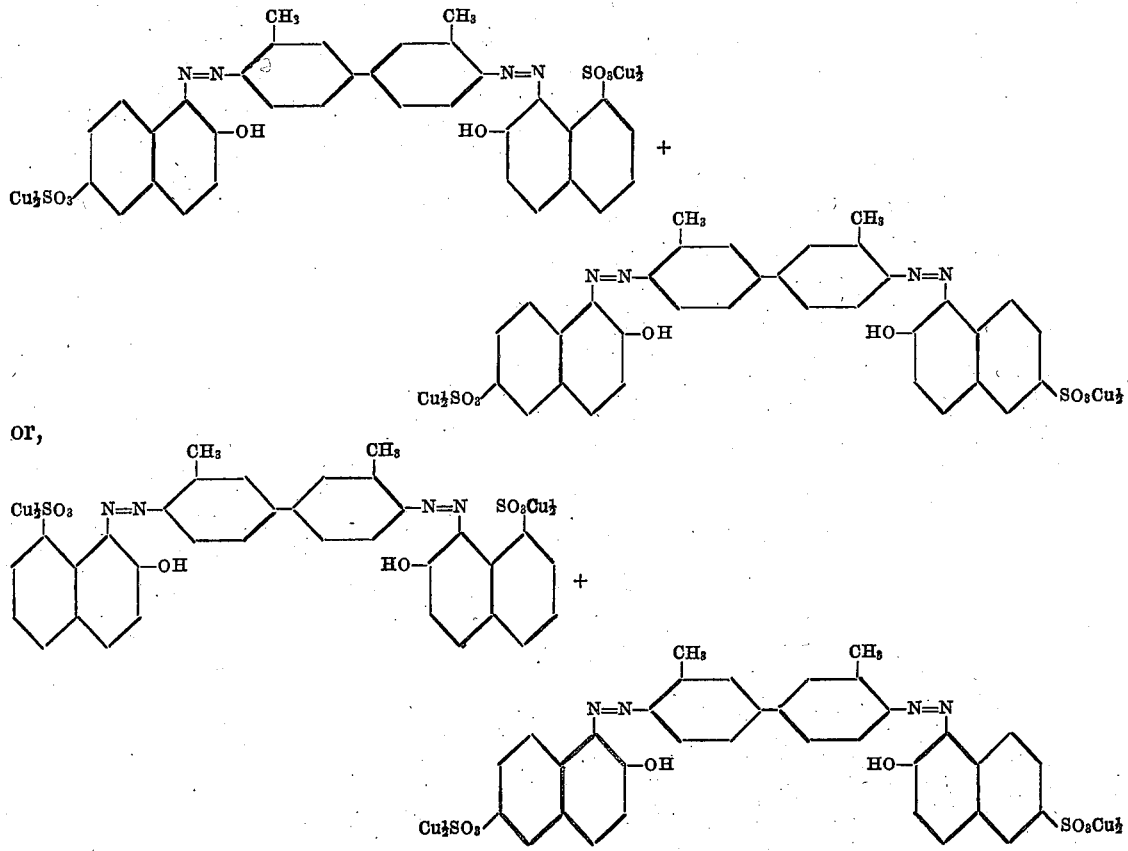

3. The process of producing the herein described compound constituting a pigment color, and forming a blue dyestuff when mixed with dextrin, comprising producing a mixture of 2-naphthol-6-sulfonic acid and 2-naphthol-8-sulfonic acid, making the solution alkaline, diluting and combining tetrazotized tolidin with said mixture of sulfonic acids, said mixture of sulfonic acids being produced by adding beta-naphthol to sulfonic acid, and heating for two or three hours at 100° C.

In witness whereof, I have hereunto signed my name in the presence of two subscribing witnesses.

ALLAN JAMES FIELD.

Witnesses:
GUSTAVE R. THOMPSON,
C. A. J. NIEHAUS.